UNITED STATES PATENT OFFICE.

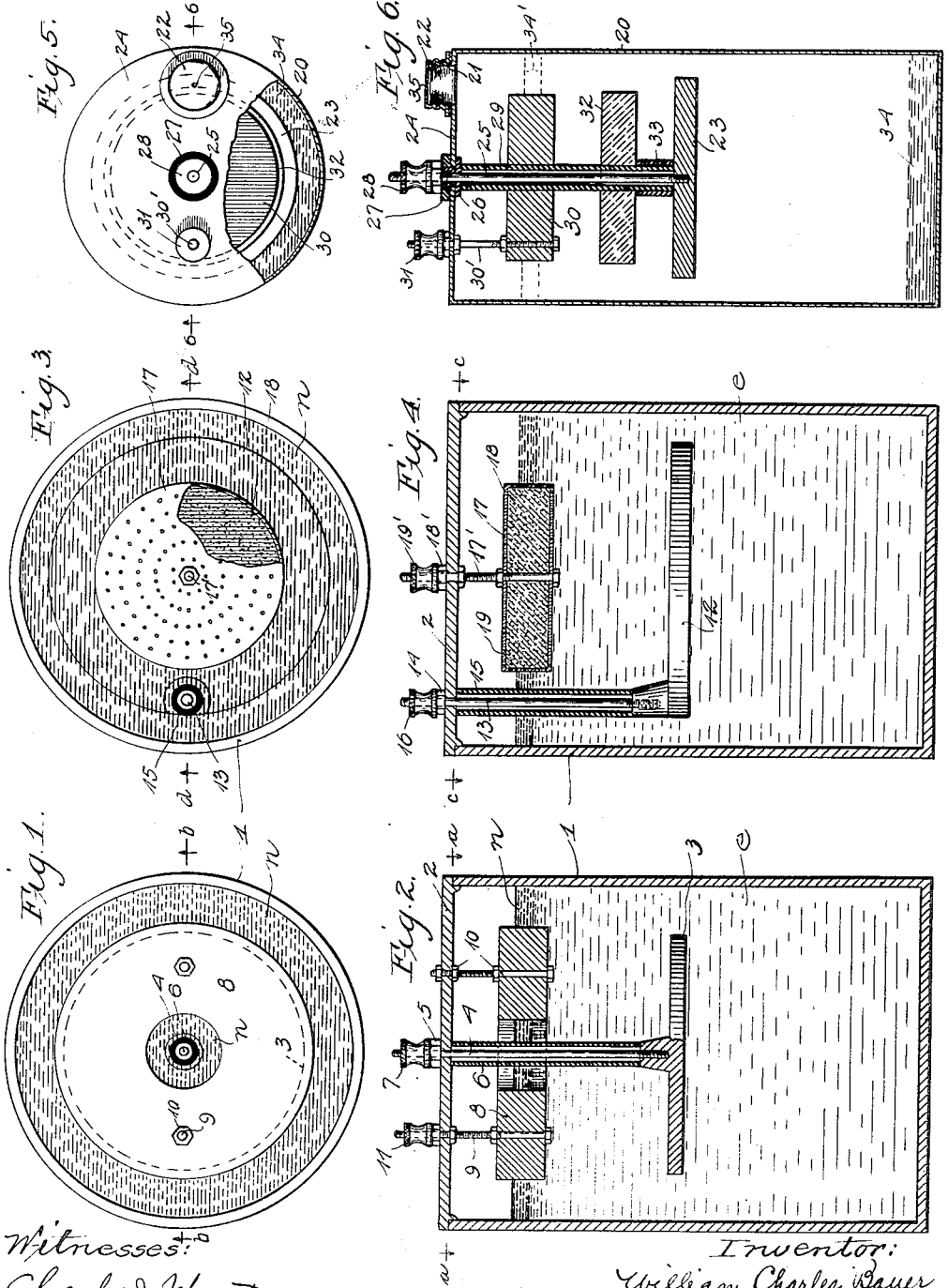

WILLIAM CHARLES BAUER, OF EVANSTON, ILLINOIS.

ELECTRIC BATTERY.

1,134,093.     Specification of Letters Patent.     Patented Apr. 6, 1915.

Application filed October 31, 1910. Serial No. 589,893.

*To all whom it may concern:*

Be it known that I, WILLIAM CHARLES BAUER, a citizen of the United States, residing at Evanston, in the county of Cook and State of Illinois, have invented certain new and useful Improvements in Electric Batteries, of which the following is a full, clear, and precise specification.

The invention relates particularly to the generation of electrical potential in electric batteries by chemical action, through the use of a class of organic oxidizing compounds in combination with electropositive and electronegative elements and alkaline electrolytes.

During the action of a battery, when it is delivering current to an external circuit, the element hydrogen is liberated by the solution of the electropositive element in the electrolyte. To keep the generation of potential constant, one of the battery constituents must be an oxidizing agent. For this purpose various inorganic oxidizing compounds are employed. As far as I am aware I am the first to employ in electric batteries for the purpose of generating electric potential by chemical action, as one of the battery constituents, in combination with electropositive and electronegative elements and alkaline electrolytes, an organic oxidizing compound of the class herein specified.

The invention consists in the utilization of organic oxidizing compounds, known generally as nitro compounds, in combination with electrolytes, especially alkaline electrolytes. A nitro compound as defined in organic chemistry is one containing one or more parts of the group of elements ($NO_2$). This group is generally called the nitro group. The compounds are formed by replacing one or more hydrogen atoms of a given organic compound by one or more ($NO_2$) groups. Thus when one of the hydrogen atoms of benzene $C_6H_6$ is replaced by ($NO_2$) we get mononitrobenzene $C_6H_5NO_2$, when two are replaced, dinitrobenzene $C_6H_4(NO_2)_2$, when three are replaced, trinitrobenzene $C_6H_3(NO_2)_3$, etc. Of the many nitro compounds possible, a few may be mentioned as examples, namely, the various derivatives of the hydrocarbons of the aliphatic and carbocyclic or aromatic series, such for example, as nitromethane $CH_3NO_2$, nitroethane $C_2H_5NO_2$, etc., nitrobenzene $C_6H_5NO_2$, nitrotoluene $C_7H_7NO_2$, etc., nitronaphthalene $C_{10}H_7NO_2$, etc. In addition to the mono derivatives we may also have the di, the tri, etc. derivatives. Also may be mentioned nitro derivatives of general organic compounds other than the hydrocarbons of which the following examples will suffice, all the derivatives of phenol, of anilin, of benzoic acid, etc. It is not my intention to limit myself to the use of any particular nitro compound, as any may be used, since the characteristic action with hydrogen is due to the ($NO_2$) group of elements. When hydrogen combines with a nitro compound it replaces either partially or entirely the oxygen of the ($NO_2$) group, the balance of the compound being generally unaffected. Hence, if R stands for any organic radical, the general formula expressing the nitro derivatives may be written as follows: $RNO_2$ for any mono-derivative; $R'(NO_2)_2$ for any di derivative; $R''(NO_2)_3$ for any tri derivative; etc.

By the action of nascent hydrogen, the nitro compound may be partially or completely reduced, the final reduction product depending on the particular nitro compound used. Taking nitrobenzene as an example, we may represent the various stages of the reduction as follows:

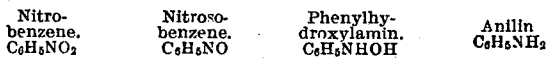

| Nitro-benzene. | Nitroso-benzene. | Phenylhy-droxylamin. | Anilin |
| --- | --- | --- | --- |
| $C_6H_5NO_2$ | $C_6H_5NO$ | $C_6H_5NHOH$ | $C_6H_5NH_2$ |

The physical condition of the alkaline electrolyte and the nature and physical condition of the cathode material determine the intermediate and also the final products, thus often other reduction products may appear due to the combination of some of the various reduction products. The condensation of nitrosobenzene with phenylhydroxylamin may occur, producing azoxybenzene which may be further reduced to hydrazobenzene. To cite nitrobenzene as an example, the various stages of the reduction may be expressed as follows:

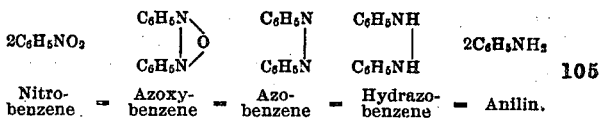

Nitrobenzene — Azoxybenzene — Azobenzene — Hydrazobenzene — Anilin.

The chemical re-action expressing the general complete reduction of any nitro compound without expressing the intermediate reduction products may be expressed as follows: $R(NO_2)$ plus $yH$ equals $R(NH_2)_x$ plus $zH_2O$. Here $x$, $y$ and $z$ are whole numbers. In carrying out my invention I use one or a combination of several of the nitro compounds. In a practical battery I employ alkaline electrolytes, especially the hydroxids of sodium, potassium or lithium, known as the alkali metals. When the battery is to be exposed to a very low temperature a mixture of lithium hydroxid with either sodium or potassium serves as the electrolyte. When exposed to low temperatures the efficiency of the nitro compounds will be enhanced if an alcohol is present. The alcohol may be added to the nitro compound or to the electrolyte. The nitro compounds dissolve in the organic solvent alcohol and since the freezing point of alcohol is below zero degrees centigrade, the resulting solution has a freezing point below zero degrees centigrade. In this manner the nitro compounds are retained in a more active liquid state. For the electropositive metal in a primary battery I use zinc, and for the electronegative element either copper, amalgamated copper, iron, nickel plated iron, nickel or carbon, i. e., an element or alloy which is practically inert in the alkaline electrolyte; or I use a negative electrode consisting of a metallic oxid or of a metal plate. The value of the nitro compounds when thus used in batteries is largely enhanced when they are used mixed with or in the presence of a metal in a finely divided state, or in the presence of a reducible metallic oxid. The metal or metallic oxid may be in a fine granular, powdered, spongy or colloidal state. The metal probably assists in drawing the nitro compounds into reaction by a sort of catalytic action. The action is probably as follows, considering as an example finely divided copper: At first the copper is oxidized at the expense of the nitro compound, then the resulting copper oxid combines with the nascent hydrogen liberated in the battery, thus: $CuO$ plus $2H$ equals $Cu$ plus $H_2O$. The reduced metal then again suffers oxidation at the expense of a further supply of nitro compound, thus: $R(NO_2)_x$ plus $yCu$ plus $ZH_2O$ equals $R(NH_2)_x$ plus $yCuO$ plus $wH_2O$. Here $x$, $y$, $z$ and $w$ are whole numbers. It is clear that the action is essentially the same when we start with copper oxid instead of with the finely divided copper, for then the initial oxidation of the copper does not take place. While the above probable explanation of the action of the metal and of the metallic oxid is offered, it is not intended to be taken as representing the action completely. The exact action is not completely understood.

I have found copper, amalgamated copper, mercury, iron, nickel, chromium, silver, palladium, platinum and manganese, also the oxids of these metals, especially efficient in combination with the nitro compounds. In this way the nitro compound serves to oxidize the liberated hydrogen in an indirect way, and only a small amount of the finely divided metal or oxid thereof is necessary. It is clear that the action is essentially the same, if instead of mixing the metal or metallic oxid with the nitro compound, we employ as a negative or cathode electrode a compressed block of a metallic oxid held in a metallic frame, or an oxidized electrode such as a metal or alloy having a layer of a metallic oxid upon its surface. The surface layer of the metallic oxid may be the oxid of the metal constituting the cathode electrode, such, for example, as copper oxid upon a copper electrode; or the surface layer of metallic oxid may be of a different metal than the cathode metal, as, for example, a layer of copper oxid upon a copper plated iron electrode, or a layer of nickel oxid upon an iron or nickel plated iron electrode, or a layer of palladium, palladium hydrosol, or palladium oxid upon a carbon, copper, iron or nickel electrode. We may employ with the nitro compounds any cathode, practically insoluble in the alkaline electrolyte, or we may use the same cathode having upon it or in contact with it a layer of a metallic oxid, or the finely divided metal; or a metallic oxid may be embedded in the pores of the cathode, as for example, a porous metallic or carbon cathode. Again, a cathode may be used having upon it a film of the particular metal which is used for this catalytic action. Instead of the oxid of the catalytically active metal, the hydroxid of that metal may be used. Therefore, as the term metallic oxygen compound is used in the various claims, it is to be understood that this term is also to embrace the hydroxids of the metals.

The nitro compounds are either solids or oily-like liquids and are generally poor conductors of electricity. In some forms of my improved battery they are used mixed with a conducting substance as an inert metal or with some form of conducting carbon, such as gas retort carbon or graphite. For the solids a good plan is to melt them and to mix them with the conducting substance and when cold to break this conducting nitro compound mixture up into granules, and to use it as such or to mix the granules with a further supply of granular or powdered conducting material. When the liquids or the anti-freezing solutions of the nitro compounds are used, a paste is made with the conducting substance. When the conducting substance is porous carbon, it is allowed to absorb the liquid nitro compound. This conducting-nitro compound mixture, as it may be termed, is packed in a perforated metallic cup either alone or together with the finely divided metal or metallic oxid to bring about the catalytic action. The metal cup serves as the electro-negative element and is made of sheet copper, amalgamated copper, iron, nickel plated iron or nickel, i. e., out of a metal practically inert in the alkaline electrolyte. This packed cup is immersed either partially or entirely in the electrolyte. The liquid nitro compounds or the anti-freezing solutions thereof may also be used in my improved gravity type of battery. The electrolyte is made of sufficient density so that the oily-like liquid nitro compound may float upon the surface of the electrolyte. An electronegative metallic, oxidized metallic, or carbon electrode, as previously described, is used partly immersed in the electrolyte and partly immersed in the floating nitro compound, or the electrode may be partially in the electrolyte, partially in the liquid nitro compound and partially exposed to the air. Instead of a simple battery plate for the elctronegative element in this form of battery, I often use a perforated metallic cup filled with carbon granules or with finely divided metal, or with metallic oxid or with carbon and the finely divided metal or metallic oxid, the finely divided metal or metallic oxid being used to bring about the catalytic action to which reference has been made above. This cup may then be immersed in a manner similar to the simple battery plate. The electronegative element can also be in the form of a cathode plate in electrical contact with an oxid plate or block and a carbon plate or block. It will be noted that by this latter method of construction the nitro compound floating upon the electrolyte is exposed to the air. It is well known that the reduction products of the nitro compounds are readily oxidized. This re-oxidation by atmospheric oxygen takes place rapidly in the presence of the alkaline electrolytes. Therefore, when current is drawn from a battery at a rate such that the reduction of the nitro compound by the liberated hydrogen is equaled by the atmospheric re-oxidation of the nitro reduction product, only a fraction of the theoretical amount of the nitro compound is necessary in any battery of a given ampere hour capacity.

Since the nitro reduction products are readily oxidized, they may be used in secondary or storage batteries. During the discharge of the battery the nitro compound will be reduced to one of its reduction products. When the battery is discharged it may be recharged by passing an electric current through it, for the electrolytic oxygen liberated will reoxidize the nitro reduction product to a higher state of oxidation. For the electro-positive metal in a secondary battery spongy iron in combination with the nitro compound and an alkaline electrolyte may be used.

For a commercial battery I prefer to use those nitro compounds which are most readily obtained on the market and which are the cheapest to manufacture. These are the nitro derivatives of the hydrocarbons of the aromatic or carbocyclic series, and of these I especially prefer the derivatives of benzene, toluene, xylene and naphthalene.

In the accompanying drawing I have shown features of my invention embodied in various commercial devices.

Figure 1 is a plan view of a primary cell taken substantially from plane $a$—$a$, Fig. 2, which Fig. 2 is a vertical diametral sectional view of the battery taken substantially on plane $b$—$b$, Fig. 1, Fig. 3 is a plan view of a modified form of cell taken substantially on plane $c$—$c$, Fig. 4, which Fig. 4 is a diametral sectional view taken substantially on plane $d$—$d$, Fig. 3, Fig. 5 is a plan view of another form of cell, and Fig. 6 is a sectional view taken on plane 6—6, Fig. 5.

Figs. 1 and 2 show a gravity type of battery, the receptacle 1 being provided with a cover 2 and containing the electrolyte $e$. The anode element 3 may be of any suitable metal, preferably zinc, and may be of any desired form, and may be suspended in any suitable manner in the electrolyte. As shown, the element is in the form of a circular disk hung from the cover 2 by means of a rod 4 secured to the cover by a nut 5, a sleeve 6 of insulating material encircling the rod between the cover and disk to prevent deterioration of the cell by short circuit. A knurled nut 7 serves to clamp conductors in electrical contact with the rod and thus with the electrode. The cathode element 8 should be of material which is inert in the alkaline electrolyte, and may be a solid block of a metal or carbon, or a metallic block coated with an oxid of the metal itself, or of some other metal, or it may be a porous carbon or metal block with a metallic oxid or hydroxid embedded in the pores. As shown in Figs. 1 and 2, this cathode electrode is in the form of an annular block, which may be suspended in any manner to be entirely immersed in the electrolyte, or only partly immersed. As shown, the block is hung from the cover by rods 9 secured by means of nuts 10, a knurled nut 11 engaging one of the rods for clamping a conductor in electrical engagement with the electrode.

The nitro compound $n$ contains preferably one or more parts of the group of elements ($NO_2$). This compound is of less specific gravity than the electrolyte, and consequently floats on top of the electrolyte adjacent the cathode electrode.

In Figs. 3 and 4 the receptacle 1 has the cover 2 and contains the electrolyte $e$, as in the form of Figs. 1 and 2. The anode element 12 is here shown in the form of a disk suspended from one side by the rod 13 extending up through and secured to the cover by a nut 14, an insulating sleeve 15 surrounding the rod, and the rod being engaged by the knurled nut 16. The cathode element is shown in the form of a perforated shell or receptacle 17 containing nitro compound 18. This compound is solid and is shown mixed with granules 19 of some conducting substance, the nitro compound itself being a poor conductor. The nitro compound may be first melted and the granules, such as carbon, then mixed therewith, and the mixture poured into the receptacle to solidify, or after solidification, the mass can be broken up into pieces, which are then filled and packed in the receptacle. The electrode shell should be of material inert in the electrolyte, and the entire electrode structure can be entirely immersed in the electrolyte or only partly, as shown; or the cathode receptacle may be filled with the above mixture and the catalytically active metal or oxid thereof, as referred to in the specification.

It is well known that in alkaline batteries the electrolyte must be protected from contact with air, and in prior batteries, oil, usually paraffin oil, is floated upon the electrolyte. With my invention this special provision of oil is unnecessary, as liquid nitro compound may be used, of less specific gravity than the electrolyte, to float thereon, and to seal it against air contact, and at the same time to act as the oxidizing agent or to assist as an oxidizing agent. In the form of Figs. 1 and 2, the nitro compound acts as an oxidizing agent and also as a seal for the electrolyte against the air. In the form of Figs. 3 and 4 I preferably pour liquid nitro compound on the electrolyte to seal the electrolyte against the air and also to assist the solid nitro compound within the cathode electrode receptacle.

In Figs. 5 and 6 I have shown a more portable type of battery. The receptacle is in the form of a thin shell 20, whose only opening is through outlet 21 threaded to receive a sealing cap 22. The anode element 23 is in the form of a disk of suitable metal suspended from the top 24 of the receptacle by a rod 25, the rod being insulated from the receptacle by means of a bushing 26 and washer 27, a knurled nut 28 serving to connect the electrode with external circuits. A sleeve 29 of insulating material surrounds the rod to protect it from the electrolyte. The cathode element 30 may be a solid block of metal or of metal coated with an oxid, or of porous metal or carbon filled with oxid, or of other forms already discussed, and is shown as suspended from the receptacle top by a rod 30' having the knurled nut 31 for connecting the electrode with external circuits. The electrode is shown as being further supported by encircling the sleeve 29.

32 represents a block of material which when dissolved in water will form the alkaline electrolyte. This block is annular to receive the sleeve 29 spaced away and insulated from the electrode 23 by the insulating bushing 33 surrounding sleeve 29. A suitable quantity of a liquid nitro compound 34 is placed in the receptacle, and during shipment will remain at the bottom of the receptacle. When the cell is to be used, cap 22 is removed and water poured in up to the proper level. The electrolyte block 32 gradually dissolves, and the resulting solution settles to the bottom of the receptacle. By having the electrolyte material 32, usually hydroxid, in the form of a solid block, the rate of solution is not great enough to generate sufficient heat to be harmful to the cell. The electrolyte will gradually become of proper density, and the nitro compound 34 will gradually rise from the bottom of the receptacle to finally float on top of the electrolyte, as indicated by dotted lines 34', the nitro compound being then adjacent and in contact with the cathode element to coöperate electrolytically therewith and also to protect the electrolyte from the air. In the screw top 22 is provided a small vent opening 35 to allow for the escape of any accumulated gas, and this vent is preferably so arranged as to allow passage of gas, but to prevent escape of liquid.

I wish it understood that I do not intend to limit myself to the details of construction as described, nor do I intend to limit myself to the use of any one particular nitro compound, as it is clear that the details of construction may be changed and that any or a mixture of the nitro compounds may be used without differing from the principle of the invention.

Therefore what I claim as new, and desire to secure by Letters Patent is as follows:

1. A depolarizer for electric batteries comprising in combination, an organic oxidizing compound, a suitable form of the element carbon and copper oxid.

2. A depolarizer for electric batteries, comprising in combination, an organic oxidizing compound, a finely divided electrically conducting substance and copper oxid.

3. A depolarizer for electric batteries, comprising an organic oxidizing compound and copper oxid coacting therewith.

4. A depolarizer for electric batteries comprising in combination, an organic oxidizing compound, a suitable form of the element carbon and a metallic oxygen compound which is practically insoluble in an alkaline electrolyte.

5. A primary electric battery comprising as its essential components, a battery jar, an alkaline electrolyte, a positive zinc element, a suitable negative element, and a depolarizer consisting of an organic oxidizer and a catalytically active substance practically insoluble in said electrolyte coacting with said organic oxidizer.

6. A depolarizer for electric batteries comprising in combination, an organic nitro compound, a suitable form of the element carbon, and an electrolytically active metallic oxygen compound which is practically insoluble in an alkaline electrolyte.

7. A depolarizer for electric batteries comprising in combination, an organic nitro compound, the element carbon and electrolytically active copper oxid.

8. A depolarizer for electric batteries comprising in combination an organic nitro compound, and a metallic oxygen compound coating therewith, the said metallic compound being practically insoluble in an alkaline electrolyte.

9. A depolarizer for electric batteries comprising in combination, an organic nitro compound and copper oxid.

10. In an electric battery, an alkaline electrolyte, a positive zinc element, a negative element practically insoluble in the said electrolyte and an organic nitro compound as a depolarizing agent.

11. In an electric battery, an alkaline electrolyte, a positive zinc element, a negative element, and an organic nitro compound containing a plurality of the nitro group of elements ($NO_2$) as a depolarizing agent.

12. In an electric battery, an alkaline electrolyte, a positive zinc element, a suitable negative element, a depolarizing mass composed of an intimate mixture of an organic nitro compound and a suitable conducting material.

13. In an electric battery, an alkaline electrolyte, a positive zinc element, a suitable negative element, and a depolarizer comprising in combination an organic nitro compound, the element carbon and an electrolytically active metallic oxygen compound which is practically insoluble in the said electrolyte, as and for the purpose herein set forth.

14. In an electric battery, an alkaline electrolyte, a positive zinc element, a suitable negative element, and a depolarizer comprising in combination an organic nitro compound, a suitable form of the element carbon, and copper oxid.

15. In an electric battery, in combination, a suitable jar, an alkaline electrolyte, a depolarizer consisting of an organic nitro compound and floating upon the said electrolyte serving therefor also to seal the said electrolyte from the air, the said nitro compound being freely exposed to atmospheric oxidation, a suitable negative element suspended in any suitable manner in the upper part of said jar and in proper electrical contact with said floating depolarizer, a positive zinc element suitably placed and held at any desired distance below the said negative element and completely immersed below the surface of said electrolyte, and proper external terminals for said positive and negative elements.

16. An electric battery, comprising a suitable jar, an alkaline electrolyte, a depolarizer consisting of an organic nitro compound exposed to air oxidation by floating upon the said electrolyte, said depolarizer thereby also sealing the said electrolyte against air action, a negative element suitably suspended in the upper part of said jar and in proper electrical contact with said depolarizer, said negative element consisting of a perforated metallic cup filled with carbon and copper oxid to coact with the said floating depolarizer as herein set forth, a positive zinc element completely immersed in said electrolyte at any suitable distance below the said negative element, and proper external terminals for said positive and negative elements.

17. In an electric battery, a suitable battery jar, an electrolyte, a depolarizer having a nitro compound as an active oxidizing agent and floating upon the said electrolyte, a positive zinc element, a negative element in proper cathodic relation to the said depolarizer, the said negative element consisting of a suitable conducting receptacle pervious to liquids and carrying a catalytically active mixture to coact with the said depolarizer and suitable external terminals for said positive and negative elements.

18. In an electric battery, in combination, a suitable battery jar, an electrolyte, a depolarizer consisting of an organic compound floating upon the said electrolyte, a positive zinc element, a negative element carrying a catalytically active substance to coact with the said depolarizer and proper external terminals for said elements.

19. In a primary electric battery, in combination, an alkaline hydroxid electrolyte, an electro-positive electrode or zinc, an electro-negative electrode insoluble in said electrolyte, a depolarizer having as the active oxygen constituent an organic chemical compound containing the nitro group of elements ($NO_2$), and means for protecting said electrolyte from direct air contact.

20. In a primary electric battery, in combination, an alkaline hydroxid electrolyte, an electro-positive electrode of zinc, an electro-negative electrode insoluble in said electrolyte, a depolarizer in electrical contact with said electro-negative electrode and having as an active oxygen constituent an organic chemical compound containing the nitro group of elements ($NO_2$), and a catalytically active body and a conducting substance coacting with said depolarizer to increase its depolarizing activity.

21. In a primary electric battery, in combination, an alkaline hydroxid electrolyte, an active electro-positive zinc electrode, an electro-negative electrode practically insoluble in said electrolyte, a depolarizer in contact with said electro-negative electrode and consisting of an organic chemical compound containing the nitro group of elements ($NO_2$), and a catalytically active substance consisting of a reducible and reoxidizable metallic oxygen compound associated with and co-acting with said depolarizer to increase its depolarizing activity.

22. In a primary electric battery, in combination, an alkaline hydroxid electrolyte, suitable electrodes, an alcoholic solvent, and a depolarizing body consisting of an organic chemical compound containing the nitro group of elements ($NO_2$) dissolved in said solvent to be retained in active liquid state and to be prevented from freezing.

23. In a primary electric battery, in combination, an alkaline hydroxid electrolyte, suitable electrodes, and a depolarizer consisting of an organic chemical compound containing the nitro group of elements ($NO_2$), said depolarizer floating upon the electrolyte to serve also to protect this electrolyte from direct air contact.

24. In a primary electric battery, in combination, an alkaline hydroxid electrolyte, an electro-positive zinc element, an electro-negative element practically insoluble in said electrolyte, and a depolarizer consisting of an anti-freezing solution of an organic chemical compound containing the nitro group of elements ($NO_2$).

25. In a primary electric battery, in combination, an alkaline hydroxid electrolyte, an electro-positive zinc element, an electro-negative element practically insoluble in said electrolyte, and a depolarizer consisting of a solution of an organic chemical compound containing the nitro group of elements ($NO_2$), said solution having a freezing point below zero degrees centigrade.

26. In an electric battery in combination, a suitable battery jar, suitable electrodes properly disposed therein, an electrolyte, an organic depolarizer supported by the said electrolyte, and a reducible and oxidizable substance coacting with the said depolarizer by a catalytic process substantially as herein set forth.

27. In an electric battery in combination, an electrolyte containing an alkali, suitable electrodes and a depolarizer having as an active oxidizing agent the nitro group of elements ($NO_2$), the said group chemically contained as a component part of a suitable organic compound.

28. In an electric battery in combination, an electrolyte containing an alkali, suitable positive and negative electrodes and a depolarizer having as an active oxidizing agent a plurality of the nitro group of elements ($NO_2$), the said groups being component parts of a suitable organic compound.

29. In an electric battery, an alkaline electrolyte, nitrobenzol as a depolarizing agent, a positive zinc element and a suitable negative element.

30. In an electric battery, an alkaline electrolyte, a depolarizer consisting of a suitable mixture of nitrobenzol and an organic liquid solvent having a freezing point below that of the said nitrobenzol, a positive zinc element and a suitable negative element.

31. In an electric battery, an alkaline electrolyte, a nitro derivative of a hydrocarbon as a depolarizing agent, a positive zinc element and a suitable negative element.

32. In an electric battery an alkaline electrolyte, a positive zinc element, a nitro compound depolarizer and a negative element practically insoluble in said electrolyte, and a finely divided metal practically insoluble in the said electrolyte co-acting with said nitro compound.

33. In combination in an electric battery, a battery jar, an electrolyte therein, an organic nitro compound depolarizer supported within said jar by said electrolyte, a positive element, and a negative element disposed in said jar to cathodically coact with said depolarizer.

34. In an electric battery an alkaline electrolyte, a depolarizer comprising a nitro compound, and co-acting with said compound a metal which is practically insoluble in said electrolyte.

35. In an electric battery, an alkaline electrolyte, a depolarizer comprising a nitro compound, and coacting with said compound a metal and a metallic oxid, the said metal and metallic oxid being practically insoluble in the said electrolyte.

36. In an electric battery, an alkaline electrolyte, a nitro compound, copper, and an oxid of copper.

37. In an electric battery, an alkaline electrolyte and a depolarizer comprising a mixture of a nitro compound and a nitro reduction product.

In witness whereof, I hereunto subscribe my name this 25th day of October, A. D., 1910.

WILLIAM CHARLES BAUER.

Witnesses:
Charles J. Schmidt,
Nelly B. Dearborn.